United States Patent [19]

Hoyda et al.

[11] Patent Number: 4,971,810

[45] Date of Patent: Nov. 20, 1990

[54] METHOD OF MAKING FIBER ENRICHED YOGURT

[75] Inventors: David L. Hoyda, Baldwinsville; Paul J. Streiff, Camillus; Edward Epstein, Manlius, all of N.Y.

[73] Assignee: Borden, Inc., Columbus, Ohio

[21] Appl. No.: 413,200

[22] Filed: Sep. 27, 1989

[51] Int. Cl.$^5$ .................... A23C 9/133; A23C 9/13
[52] U.S. Cl. ..................... 426/43; 426/583; 426/61
[58] Field of Search ............ 426/34, 36, 40, 42, 426/43, 44, 46, 53, 61, 583

[56] References Cited

U.S. PATENT DOCUMENTS

| | | |
|---|---|---|
| 3,128,190 | 4/1964 | Donay et al. |
| 4,180,595 | 12/1979 | Lauredan . |
| 4,181,747 | 1/1980 | Kickle et al. |
| 4,304,768 | 12/1981 | Staub et al. |
| 4,410,549 | 10/1983 | Baker . |
| 4,421,771 | 12/1983 | Stock et al. |
| 4,797,289 | 1/1989 | Reddy . |
| 4,837,036 | 6/1989 | Baker et al. |

OTHER PUBLICATIONS

Spiller et al.; "Dietary Fiber In Human Nutrition"; *Critical Reviews In Food Science And Nutrition;* Nov. 1975, pp. 39–70.

Freedman; "Kraft To Introduce Ice Cream Free of Fat, Cholesterol"; *The Wall Street Journal;* Sep. 21, 1989.

*Primary Examiner*—Marianne Cintins
*Attorney, Agent, or Firm*—Beatrice, Noback, Robbins

[57] ABSTRACT

Yogurt and fruited yogurts are fiber fortified without any resultant adverse taste or mouthfeel due to the fiber by using selected sources of fiber which include soy fiber, oat fiber, and gum arabic. Plain yogurt and Swiss style fruited yogurt can be fiber enriched with up to 6 grams of fiber and preferably 3.5 grams of fiber per 8 ounces by adding gum arabic and/or soy fiber to the yogurt base mix or to the yogurt fruit product. Yogurt fruit product as well as fruit jams and fruit preserves are enriched with up to 4 grams of fiber and preferably 2.5 grams of fiber per 25 grams of fruit product by judicious use of soy fiber, oat fiber and/or gum arabic as the source of fiber. Sundae style fruited yogurt may be fiber enriched with up to 10 grams and preferably 7 grams of fiber per 8 ounces of product.

16 Claims, No Drawings

METHOD OF MAKING FIBER ENRICHED YOGURT

BACKGROUND OF THE INVENTION

1. Field of the Invention

The present invention relates to a method of enriching cultured dairy products with high levels of dietary fiber. The invention further relates to a method of fiber enriching fruit products that can be used to make Swiss style and Sundae style fruited yogurts.

2. Background of the Invention

In recent years, many medical studies have been presented showing the benefits of fiber in the human diet. Public awareness of health benefits of fiber in the diet has also increased in recent years. With more and more people aware of fiber and its benefits, more and more people are searching for products containing fiber.

Dietary fiber is the portion of plants which is not broken down by chemical action in the digestive system. This "indigestible" fiber often was called roughage a few generations ago. The fibrous parts of meat are not considered dietary fiber. Some of the sources of dietary fiber are cellulose, hemicellulose, lignin, gum, and pecton. Pectin is known to home canners as the substance that helps turn some fruit juices into jelly. Natural gums contain high amounts of dietary fiber. Different plants have different kinds of fiber. Bran is almost entirely cellulose; apples, grapes, and some other fruits are high in pectin. The amount of fiber varies from one kind of plant to another and may vary within a species or variety depending on growing conditions and maturity of the plant at the time of harvest.

Soy fiber has been consumed as a portion of soy flour, soy grits and other soybean derived food products, especially in Chinese, Indonesian and Japanese foods, including "tempeh", "miso" and "thuanao". Vegetable fiber may comprise up to about 4.5% by weight of "thua-nao" made from whole soybeans. (In the following discussion all percentages are by weight unless otherwise noted.)

Traditionally, wheat bran has been included in dry breakfast cereals for many years, and a uniform, relatively low level of food fiber has been present in rye breads, cracked and whole wheat breads, and other specialty breads. However, other parts of the average diet comprise highly processed foods, so the alternative choices to the above goods have become increasingly more dense, with less fiber than is now considered necessary for good gastrointestinal function. To make up for the asserted deficiency in dietary fiber, larger amounts of dietary fiber have been introduced into such products as high fiber cereals, baked goods including bread, pancakes, cookies, pasta and snack foods.

Recently, oat bran has been reported to be an especially desirable source of dietary fiber and it is now being incorporated into a seemingly endless variety of foods.

Dairy products and the dairy industry have been slow to respond to consumers' interest and demand for fiber enriched products and are a class of foods that has not generally been fiber fortified.

Dairy products have recently come under fire from researchers showing the detrimental effects of saturated fat and cholesterol in the body. These same researchers positive effects of fiber in the diet. Studies have shown that dietary fiber reduces the risk of coronary heart disease and some forms of cancer.

One dairy product that stands out as suitable carrier for fiber is yogurt. Low fat yogurt has the health benefits of high protein, high calcium, low fat, low calories and active cultures. Fiber enrichment of yogurt fits in well with its other benefits. The most popular benefit fiber is its link to the reduction of the levels of cholesterol in blood.

Yogurt is, conventionally, a cultured milk product produced by fermenting dairy ingredients, such as milk, skim milk, partially skim milk, cream, nonfat milk solids, used alone or in combination with lactic acid producing cultures. Depending upon the dairy ingredients employed, other ingredients and the processing treatment, yogurt may be prepared in various forms. Frozen yogurt, at one extreme, is generally consumed in hard frozen or soft serve form. Liquid yogurt, at the other extreme, is consumed by drinking as contrasted with by use of a spoon. The most common or so-called conventional form of yogurt is firm bodied, smooth and viscous, generally having the consistency of a light gel which is pudding or custard-like and spoonable. What has now become known as European style yogurt is a thin-bodied version of conventional yogurt, but not as thin as liquid yogurt, and not drinkable.

Fruit-flavored yogurts are made Sundae style with fruit product on the bottom, Swiss style with fruit product pre-mixed, or Western style with the fruit product on the bottom and the yogurt colored and/or flavored with additional flavoring agents such as natural and artificial liquid flavorings. Fruited yogurts are traditionally made with standard fruit products referred to as yogurt fruit, yogurt fruit products or simply fruit product. Fruit products generally are made by cooking a fruit and sugar mixture. If the cooked product has discernible pieces of fruit in it, the fruit product is said to be a fruit product containing fruit piece identity. If to be fruit in the cooked product is finely divided, the fruit product is said to be in puree form.

The milk base for yogurt, depending on taste, display varying butterfat contents and yogurts may be prepared with fat contents in a range from 0.1-3.5 percent by weight. According to FDA labeling standards, yogurt may be labeled as "nonfat" if it contains less than 0.5% milkfat; as "low fat" it if contains from not less than 0.5% to no more than 2% milkrat; and as full fat or regular yogurt if contains at least 3.25% milkfat. Most commercially available yogurts are "low fat" by FDA labeling standards.

Yogurt is generally made by a method that includes (1) heat treating yogurt base mix comprising milk and sweetener at a predetermined upper temperature range in order to pasteurize the mix;

(2) cooling the yogurt mix to a predetermined lower temperature range;

(3) adding and blending yogurt starter cultures with the yogurt mix while maintaining the lower temperature range;

(4) incubating the cultured yogurt mix at the lower temperature range until a thickened yogurt product is produced; and (5) cooling the yogurt product.

Sundae style fruited yogurt is generally made in a serving size cup by filling cultured yogurt mix over or under a suitable amount of fruit product and incubating the filled cup for a suitable time. Swiss style fruited yogurt is generally made by mixing a suitable amount of fruit product with yogurt product (i.e., after completion of the incubation step). Fruited yogurts usually contain from about 10% to 30% fruit product by weight based on the weight of the fruited yogurt.

DESCRIPTION OF PRIOR ART

Fiber fortified yogurts are disclosed in U.S. Pat. No. 4,797,289 to Reddy. Reddy fiber fortifies in order to improve the growth of Lactobacillus acidophilus. Reddy adds fiber to yogurt mix prior to any heating step. Alternately, Reddy mixes fiber into a commercially prepared fruit puree from Lyons Magnus Co., Clovis, CA and uses the mix to make fruited yogurt. Reddy states that when the concentration of fiber in the yogurt base exceeds 0.5% (i.e., 1.13 grams per 8 ounces of yogurt) fiber tends to settle to the bottom of the container. This fact is borne out by the examples wherein Reddy's fiber enriched yogurts were grainy. When apple fiber was used the yogurt was slightly grainy. When pear fiber was used, the yogurt was extremely grainy.

A fiber enriched yogurt has been made and sold by the Darigold Corp. of Seattle, WA. The Darigold product was enriched with about 1.2 grams of apple fiber per 8 oz. serving.

SUMMARY OF THE INVENTION

The invention relates to the discovery that cultured dairy products such as yogurt product can be fortified with from two grams up to 6 grams and more of dietary fiber per 8 ounce serving while remaining free from any unacceptable mouthfeel due to the fiber if selected sources of dietary fiber are used. Before now, yogurt products fortified with levels of fiber more than about 1.2 grams per 8 ounce serving had unacceptable mouthfeel due to the fiber.

The embodiments of the invention describe methods for the fiber enrichment of lowfat yogurt with selected fiber sources. One method involves adding a selected fiber source to yogurt base in order to achieve an inventive yogurt which contains a minimum of 2 grams of dietary fiber per 8 ounce serving. The selected fiber sources that can be used for enrichment of yogurt base include soy fiber, oat fiber and gum arabic. Another method takes plain (i.e., non fiber enriched) yogurt base, adds an inventive fiber enriched fruit product which yields a yogurt with a minimum of 3 grams of dietary fiber per 8 ounce serving. The fiber sources used to make the inventive fruit product may include soy fiber, oat fiber, prunes or any other compatible source including gum arabic. Another method combines an inventive fiber enriched base and inventive fiber enriched fruit to yield a fruited yogurt product with five to six grams and more of dietary fiber per eight ounce serving.

The process of the invention brings to the yogurt market a product with the highest dietary fiber content of any dairy product currently available along with the benefits of dietary fiber. The process brings together soluble dietary fiber (gum arabic or other soluble fiber sources) and insoluble dietary fiber which the cereal industry has already taken advantage of. Use of a combination of the two fibers is claimed to be helpful in promoting cholesterol reduction. Fiber has also been claimed as helpful in the reduction of the incidence of constipation, colon cancer, intestinal diverticulosis, and varicose veins.

DETAILED DESCRIPTION OF THE INVENTION

All embodiments of the invention require the use of certain suitable fiber sources which include soy fiber, oat fiber, gum arabic and in some cases prunes. According to embodiments of the invention (on an 8 ounce of product basis), plain yogurts and Swiss style yogurts are made to contain up to 6 grams of fiber and preferably up to 3.5 grams of fiber. Sundae style yogurts are made to contain up to 10 grams of fiber and preferably up to 7 grams of fiber. According to another embodiment of the invention (on 25 gram cooked fruit product basis), fruit product is made to contain up to 4 grams of fiber and preferably up to 2.5 grams of fiber.

In one embodiment, an inventive fiber enriched yogurt product has been made by adding soy fiber and/or gum arabic to yogurt base mix in a standard process for making yogurt. According to this embodiment, the yogurt can be enriched with up to at least 3.5 grams of fiber per 8 ounces of product.

In another embodiment, an inventive fiber enriched fruit product has been made. In the process, a source of fiber is added to a fruit and sugar mix before it is cooked. The preferred fiber sources are oat fiber, soy fiber, gum arabic, and combinations thereof. Another fiber source that can be used is prunes. Fresh pitted prunes contain 16% dietary fiber. Up until now, prunes have not generally been used to make fruited yogurt. However, prunes are a good source of fiber and in one embodiment of the invention prunes are added to fruit mix prior to cooking. The inventive fruit product can have an enrichment as high as 4 grams of fiber per 25 grams of fruit product. Preferably, the inventive fruit product has an enrichment of up to about 2.5 grams of fiber per 25 grams of fruit product.

In other embodiments, by careful selection of the source of the fiber, Sundae style fiber enriched yogurt products have been prepared. In one case, plain yogurt mix is combined Sundae style with the inventive fiber enriched fruit product. Alternately, the inventive fiber enriched yogurt mix is combined Sundae style with the inventive fiber enriched fruit product.

By careful selection of the source of fiber, fiber enriched Swiss style yogurt products have been made. According to the invention, Swiss style yogurt products can be fiber enriched up to a maximum amount of 6 grams and preferably up to a maximum of about 3.5 grams per 8 ounces in one of three ways: (1) by fiber enriching the yogurt base only; (2) by fiber enriching the fruit product only; and (3) by fiber enriching both the yogurt base and the fruit product with the proviso that in all cases the amount of fiber enrichment does not exceed about 6 grams per 8 ounces of the Swiss style product.

Cultured dairy products are made from a base mixture and a starter culture suitably chosen for the kind of cultured dairy product to be made. The base mixture is milk based. The base mix and the starter culture are incubated to make the desired cultured dairy product.

The yogurts of the examples were made from a standard yogurt base mixture that included cream, nonfat dry milk (NFDM), sugar, stabilizer, gelatin and skim milk. A source of fiber was included in the yogurt base mixture at this point. The base mix was heated and homogenized by conventional means in the 180° F.–85° F. range for about 30 minutes. The homogenized mix was cooled down to a temperature suitable for incubation and in the range of 108° F. -110° F. and the mix was inoculated with yogurt culture. The inoculated yogurt mix was handled in one of three ways. When unfruited yogurt was made, inoculated fiber enriched yogurt mix was flowed into 8 ounce cups and incubated at 108° F. -110° F. until a suitable pH was reached. A suitable pH is generally in the range of 4 to 5 and preferably 4.6.

When inventive Sundae style fruited yogurt was made, 36 grams of inventive fiber-enriched fruit was placed in the bottom of an 8 ounce cup prior to filling the cup with inoculated base mix. The filled cups were then incubated as described above until a suitable pH was reached.

When inventive Swiss style fruited yogurt was made, yogurt product (i.e., inoculated yogurt mix that had been incubated to a suitable pH) was mixed with inventive fiber enriched fruit and filled into 8 ounce cups. The amount of fruit added was 20% by weight (i.e., 45 grams/8 ounces of final product). In all cases, the incubated product was cooled and refrigerated once the proper pH had been reached.

In the examples of the invention, the following sources of fiber were used: oat fiber, soy fiber, gum arabic and prunes.

The oat fiber was Williamson Oat Fiber #780, a commercial preparation of D.D. Williamson & Co., P.O. Box 6001 Louisville, KY 40206. The fiber is fine and fluffy and has a dietary fiber content of 97.8%.

The soy fiber was a fiber sold under the name Microsoy, a commercial preparation of Howard Hall International, P.O. Box 199, CosCob, CT 06807. The fiber is derived from soy cell walls. The soy fiber is a white, tasteless, odorless, high bulking powder and has a dietary fiber content of 95%.

The gum arabic was Hi-Tek Gum Arabic #2, a commercial preparation of Hi Tek Polymers, 290 Brighton Rd., Clifton, NJ 07012. Gum arabic is a fine white powder and it is water soluble. It is derived from dried exudate of the stems and branches of acacia senegal trees, harvested exclusively in Sudan. Gum arabic contains 94.5% of dietary fiber.

The prune fiber source was fresh whole pitted prunes. Fresh prunes contain 16% dietary fiber.

The stabilizer was Hi-Tek Stabilizer 689Y, a commercial preparation of Hi-Tek Polymers of Clifton, NJ.

The gelatin was a 250 Bloom Gelatin, a commercial preparation of Germantown Manufacturing of 505 Parkway, Bloomall, PA 19008. Gelatin is derived from animal skin or hoof.

The yogurt starter culture used was a commercial preparation of Chr. Hansen's Laboratory, 9015 W. Maple, Milwaukee, WI 53214. The yogurt culture as employed was a combination of Lactobacillus bulgaricus and Streptococcus thermophilus present in a one to one ratio. Culturing can be done by direct set or by bulk culturing methods. In the examples, the yogurt starter culture was bulk cultured. The strains of lactic acid producing bacteria were suspended in a skim milk solution with 10 to 12% solids that has been sterilized prior to adding the bacteria.

All of the fiber enriched fruit products were prepared at the direction of the applicants by the Lyons Magnus Co., Clovis, CA and Imperial Flavors, Winterhaven, FL. The recipes are based on standard yogurt fruit products containing fruit piece identity. The fruit products were cooked with about 7.-8% fiber by weight to produce a finished product providing about 2 grams to 2.5 grams of fiber per 25 grams of fruit product. When this fruit product was used in the yogurt formulations of the invention, 3 grams of dietary fiber per 8 ounce serving were achieved.

In contrast, the Reddy patent referred to above physically mixes pear fiber or apple fiber with a Lyons Magnus standard puree and uses the mix to make fruited yogurt. The crude, unrefined composition of apple fiber and pear fiber are such that they give a sensation of graininess when used in a milk product. The preferred fiber sources of the invention (i.e., gum arabic, soy fiber, and oat fiber) are cleaner in terms of flavor, odor, texture, and color and when used to fiber enrich yogurt the finished product demonstrates good mouthfeel. Although the fiber enriched fruit products of the examples were made to contain fruit pieces with identity, the fruit product could have been in puree form. It is contemplated that any cooked fruit preparation that is suitable for use in making fruited yogurt can be fiber fortified according to the invention just as long as a properly selected fiber source is mixed into the fruit mix and subsequently cooked. The cooked fruit preparation can be made with any suitable sugar substitute.

In the examples of the invention, yogurt mix was pasteurized and homogenized before being inoculated with culture.

It is contemplated that other cultured dairy products can be fiber-enriched according to embodiments of the invention including such products as buttermilk.

The following examples describe specific demonstrations of the invention. In these examples, and elsewhere in this application, all parts and percentages are by weight and all temperatures are in degrees Fahrenheit, unless expressly stated to be otherwise. Ounces are avoirdupois weight ounces unless otherwise specified.

EXAMPLES

FIBER FORTIFIED FRUIT PRODUCT

Fruit product was prepared according to standard procedures for making a cooked fruit preserve for use by the yogurt industry. The process comprised mixing sugar, fresh fruit, a fiber source, and optional ingredients in a container over a source of heat. The mix was heated and cooked at temperatures just below the boiling point for a time sufficient to complete cooking. Generally the mix is considered cooked when 185° F. is attained for a minimum of 30 minutes.

Typical recipes are as follows:

Swiss Style Fruit Product

Strawberry:
    40-55% Strawberries
    30-40% Sugar
    7-12% Fiber Source
    1-3% Modified Food Starch
    Remaining % Water
Raspberry:
    40-55% Raspberries
    30-40% Sugar
    7-12% Fiber Source
    1-3% Modified Food Starch
    Remaining % Water Sundae Style Fruit Product Strawberry:
    35-45% Strawberries
    15-25% Sugar
    15-20% Corn Syrup (63 DE)

5-10% Microsoy
2-4% Modified Food Starch
Remaining % Water

Raspberry:
  35-45% Raspberries
  10-20% Sugar
  6-12% Corn Syrup (63 DE)
  5-10% Microsoy
  1-3 Modified Food Starch
  Remaining % Water The fiber enriched fruit products used in the following examples were made essentially as described above and essentially according to the recipes set forth above.

EXAMPLES 1-11

PREPARATION OF FIBER FORTIFIED SUNDAE STYLE FRUITED YOGURT PRODUCTS

Example 1 —Sundae Style Fruited Yogurt Made With Oat Fiber Enriched Fruit

As a first step, 36 grams of an oat fiber enriched Sundae style strawberry fruit product which contained about 7.6% oat fiber was placed in the bottom of each of several 8 ounce cups.

Meanwhile, a standard inoculated yogurt base mix was prepared as follows:

168 grams of NFDM (non fat dry milk), 15 grams of stabilizer, 7.5 grams of gelatin and 300 grams of sugar were combined and added to a mixture of 239 grams of 38% cream and 4270 grams of skim milk with proper agitation. The mix was heated to 150° F., homogenized at 1500/500 psi and further heated to 180° F. -185° F. and kept at that temperature for 30 minutes. The mix was cooled to 108°F. to 110° F. and inoculated with 50-75 grams of bulk culture yogurt starter.

The inoculated mix was poured on top of the oat fiber enriched strawberry fruit product in the previously prepared cups. The cups were filled until they each contained a total of 8 ounces of product (226.8 grams). The filled cups were placed in an incubator until the pH reached was about 4.6. When the pH reached the desired level, the cups were removed from the incubator and placed in a refrigerator and cooled to 40° F.

The final product provided 3 grams of dietary fiber per 8 ounce serving. (N.B. The fiber content of the final product as stated here and in the rest of the examples is obtained by rounding off the calculated amount to the nearest gram which is a procedure that conforms to accepted labeling practice.) The product was taste tested. The flavor and the mouthfeel were deemed acceptable.

Example 2 —Sundae Style Fruited Yogurt Prepared From Soy Fiber Enriched Base Mix As a first step, 36 grams of standard Sundae style yogurt fruit product was placed in the bottom of each of several 8 ounce cups. The fruit product used was a standard Sundae style yogurt fruit sold by Lyons Magnus (i.e. not fiber enriched).

Meanwhile an inoculated soy fiber enriched yogurt base mixture was prepared as follows:

192 grams NFDM, 15 grams stabilizer, 7.5 grams gelatin, 300 grams sugar and 75 grams Microsoy were combined and added to a mixture of 239 grams 38% cream and 4-172 grams skim milk with proper agitation. The mixture was heated, homogenized, further heated and inoculated with 50-75 grams of bulk culture yogurt starter as done in Example 1.

The soy fiber enriched inoculated mix was filled on top of the fruit product in the previously prepared cups. The filled cups were incubated and cooled as described in Example 1.

The final product provided 3 grams of dietary fiber per 8 ounce serving and the product had no objectionable flavor or mouthfeel properties.

Example 3 —Sundae Style Fruited Yogurt Prepared From Gum Arabic Enriched Base Mix As a first step, 36 grams of standard Sundae style yogurt fruit product was placed in the bottom of each of several 8 ounce cups. The fruit product used was a standard Sundae style yogurt product sold by Lyons Magnus (i.e. not fiber enriched).

Meanwhile, an inoculated gum arabic enriched yogurt base mixture was prepared as follows:

192 grams NFDM, 15 grams stabilizer, 7.5 grams gelatin, 300 grams sugar and 75 grams gum arabic were processed and then inoculated as described in Example 1.

The gum arabic enriched inoculated mix was poured over the previously prepared standard fruit product, incubated to a proper pH and cooled as in the previous examples.

The Sundae style fruited yogurt product of this example was made with gum arabic and the final product did not have an overly thick body. The product provided grams of soluble dietary fiber per 8 ounce serving. The product had no objectionable flavor or mouthfeel properties.

EXAMPLES 4-11

SUNDAE STYLE FRUITED YOGURT MADE FROM FIBER ENRICHED BASE MIX AND FIBER ENRICHED FRUIT PRODUCT

The fiber fortified Sundae style fruit product used in these examples were prepared according to the specifications shown in Table 1.

TABLE 1

| | Sundae Style Fruit Products Specifications | |
|---|---|---|
| Example No. | Fruit Used | Dietary Fiber Source | Approximate Amount of Fiber Per 25 Grams of Cooked Fruit Product |
| 4 | Strawberry | Soy fiber | 2 grams |
| 5 | Blueberry | Soy fiber | 2 grams |
| 6 | Raspberry | Soy fiber | 2 grams |
| 7 | Peach | Soy fiber | 2 grams |
| 8 | Strawberry banana | Soy fiber | 2 grams |
| 9 | Blueberry and prune | Soy fiber and prune | 2.5 grams |
| 10 | Raspberry and prune | Soy fiber and prune | 2.5 grams |
| 11 | Strawberry, banana and prunes | Soy fiber and prune | 2.5 grams |

For each of these examples, Sundae style fruited yogurt was prepared according to the same procedures used in the previous examples. The base mix for each example was fiber fortified with gum arabic and made up from the following mix: 230 grams NFDM, 300 grams sugar, 15 grams stabilizer, 7.5 grams gelatin, 75 grams gum arabic, 2-18 grams 38% cream and 4199 grams skim milk.

The Sundae style yogurt product of each example was taste tested.

The fruit used in Examples 4-8 contained soy fiber as the only source of added fiber. The Sundae style yogurts made with these fruit preparation provided 5 grams of dietary fiber per 8 ounce serving. In the 8 ounce serving, about half the dietary fiber was a soluble fiber (gum arabic) and about half of the dietary fiber was insoluble (soy fiber). When the yogurts of these examples were taste tested, the yogurts had no objectionable flavor or mouthfeel properties.

The fruit used in Examples 9-11 contained two sources of added fiber, major amounts of soy fiber and minor amounts of prunes. The Sundae style yogurts made with these fruit preparations provided 6 grams of dietary fiber per 8 ounce serving. About half of the dietary fiber was soluble dietary fiber (gum arabic) and about half of the dietary fiber was insoluble dietary fiber (soy fiber and prune fiber). When the yogurts of these examples were taste tested, they were deemed acceptable and had no objectionable flavor or mouthfeel properties.

EXAMPLES 12-13

PREPARATION OF FIBER FORTIFIED SWISS STYLE FRUITED YOGURT PRODUCTS

Example 12 —A Standard Plain Yogurt Product Mixed With Oat Fiber Enriched Swiss Style Fruit Product As a first step, an oat fiber enriched Swiss style strawberry fruit product which contained about 7.6% oat fiber was obtained and set aside.

Meanwhile, a standard cultured yogurt product was prepared as follows:

123 grams NFDM, 27.5 grams stabilizer and 150 grams sugar were combined and added to a mixture of 96 grams 38% cream and 4493 grams skim milk with proper agitation. The mix was heated, homogenized, further heated, inoculated and incubated to a proper pH for a standard cultured yogurt product.

In a final step, the cultured yogurt product was mixed with the previously obtained oat fiber enriched fruit product which contained about 7.6% oat fiber using a ratio of 4 parts by weight of yogurt to 1 part by weight of fruit product to thereby make Swiss style yogurt product. The final product was packaged 8 ounces to a cup and the filled cups were refrigerated.

The final product provided 3 grams of dietary fiber per 8 ounce serving. The product was taste tested. The flavor and mouthfeel were deemed acceptable.

Example 13 —Soy Fiber Enriched Plain Yogurt Product Mixed With Standard (Non-Fiber) Swiss Style Enriched Fruit Product As a first step, a standard Swiss style fruit product was obtained from Lyons Magnus.

Meanwhile, a soy fiber enriched cultured yogurt product was prepared as follows:

218 grams NFDM, 27.5 grams gelatin, 150 grams sugar and 75 grams soy fiber were combined and added to a mixture of 218 grams 38% cream and 4311 grams skim milk with proper agitation. The mix was heated, inoculated and incubated to a proper pH for a cultured yogurt product.

In a final step, the soy fiber enriched cultured yogurt product was mixed with the previously obtained standard fruit product in the same weight ratios as set forth in the last example.

The fiber fortified Swiss style yogurt of this example provided 3 grams of dietary fiber per 8 ounces of product. The product was taste tested and there was no objectionable flavor or mouthfeel properties.

CONCLUSIONS

The examples show the surprising fact that fruited low fat yogurts can be fortified with as much as 6 gram of dietary fiber if the fiber sources are properly selected.

If the yogurt base used to make a yogurt product is to be fiber fortified, the fiber sources to use include gum arabic, soy fiber or a mixture of the two. It is postulated that oat fiber is another suitable fiber source.

If a standard Swiss style fruit product or standard Sundae style fruit product is to be fiber fortified, the fiber sources to use include oat fiber, soy fiber, gum arabic, combination of these, and alternatively, prunes can be used together with one of the previously named fiber sources so as to provide a part of the added fiber.

Examples of the invention have been provided and they show that fiber enriched fruited yogurts can be made using certain fiber sources wherein 3 grams of dietary fiber, 5 grams of dietary fiber and 6 grams of dietary fiber can be provided in an 8 ounce serving.

By judiciously choosing a combination of the fiber sources disclosed in this application, it would be possible to make acceptable fruited yogurts that contain up to 10 grams of dietary fiber per 8 ounces of product.

It is contemplated that any fruit product that can be used to make fruited yogurt can be fiber enriched according to the invention, if the fruit product is made with a cooking step and the fiber is added to the fruit before the cooking step.

It is contemplated that all conventional jams and preserves can be fiber fortified according to the invention.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed:

1. A method of making fiber enriched yogurt product comprising the steps of:
   (a) preparing a base mixture comprising milk and a source of dietary fiber, said source selected from a group consisting of gum arabic, soy fiber, oat fiber and mixtures thereof;
   (b) pasteurizing and homogenizing the base mixture;
   (c) cooling the base mixture;
   (d) inoculating the cooled base mixture with lactic acid producing culture; and
   (e) incubating until the pH drops to a pH in the range of 4-5;

wherein the total amount of fiber added provides an amount of dietary fiber in the range of about 2 grams to not more than about 6 grams per 8 ounces of product.

2. The method of claim 1 wherein said yogurt product is no fat, low fat or full fat yogurt product.

3. The method of claim 2 wherein said yogurt product is low fat yogurt product.

4. The method of claim 3 wherein said amount of dietary fiber is from about 2 grams to about 3.5 grams per 8 l ounces of product.

5. A method of making fiber enriched Swiss style fruited yogurt product comprising the steps of:
   (a) preparing a base mixture comprising milk;
   (b) inoculating said base mixture with lactic acid producing culture;
   (c) incubating said product of step (b) until the pH drops to a pH in the range of 4 to 5;
   (d) mixing said product of step (c) with an amount of fiber enriched fruit product;
wherein said fiber enriched fruit product was made by a process comprising cooking a mixture comprising fruit, sweetener and an amount of fiber wherein said amount of fiber is up to about 4 grams 25 grams of cooked fruit product, and wherein said fiber is selected from a group consisting of soy fiber, gum arabic, oat fiber, and mixtures thereof wherein the amount of said fiber in said fiber enriched Swiss style fruited yogurt is from at least about 2 grams to about 6 grams per 8 ounces.

6. The method of claim 5 wherein the yogurt product is non fat, low fat, or full fat yogurt.

7. The method of claim 6 wherein said suitable amount of said fiber enriched fruit product is up to about 30% by weight based on the weight of said cultured dairy product.

8. A method of making fiber enriched Swiss style fruited yogurt product comprising the steps of:
   (a) preparing a base mixture comprising milk and a first source of dietary fiber, said first source selected from a group consisting of soy fiber, gum arabic, oat fiber and mixtures thereof;
   (b) homogenizing and pasteurizing the base mixture;
   (c) inoculating he base mixture with lactic acid producing culture;
   (d) incubating until the pH drops to a pH in the range of 4–5;
   (e) mixing said product of step (e) with an amount of fruit product, said fruit product comprising a second source of dietary fiber;
wherein said first source of dietary fiber and said second source of dietary fiber taken together provide a total amount of dietary fiber of from about 2 grams to not more than about 6 grams per 8 oz. of final product; wherein said fruit product is made by a process comprising cooking a mixture comprising fruit, sweetener and the second source of dietary fiber wherein the second source of dietary fiber is selected from a group consisting of soy fiber, gum arabic, oat fiber, and mixtures thereof and wherein said second source of dietary fiber provides an amount of dietary fiber of up to about 4 grams per 25 grams of fruit product.

9. The method of claim 8 wherein said yogurt is non fat, low fat, of full fat yogurt.

10. The method of claim 9 wherein said total amount of dietary fiber is not more than 3.5 grams per 8 ounces of product and wherein said second source of dietary fiber provides an amount of dietary fiber of up to about 2.5 grams per 25 grams of fruit product.

11. A method of making fiber enriched Sundae style fruited yogurt product comprising the steps of:
   (a) preparing a base mixture comprising milk and a first source of dietary fiber, said first sourced selected from a group consisting of soy fiber, gum arabic, oat fiber and mixtures thereof wherein the amount t of said first source of dietary fiber is not more than 6 grams per 8 ounces of base mixture;
   (b) pasteurizing and homogenizing the base mixture;
   (c) inoculating with yogurt culture;
   (d) pouring the product of step (c) over a fiber enriched fruit product wherein said fiber enriched fruit product partially fills a container; and
   (ed) incubating the product of step (d) until the pH drops to a level in the range of 4 to 5;
wherein said fiber enriched fruit product is made by a process comprising cooking a mixture comprising fruit, sweetener and a second source of dietary fiber wherein said second source of dietary fiber is selected form a group consisting of soy fiber, gum arabic, oat fiber, prunes and mixtures thereof, wherein said second source of dietary fiber provides an amount of dietary fiber of up to about 4 grams per 25 grams of fruit product and wherein said first source of dietary fiber taken together with said second source of dietary fiber provide a total amount of fiber from about 2 grams to not more than about 10 grams per 8 ounces of final product.

12. The method of claim 11 wherein said yogurt is non fat, low fat, or full fat yogurt.

13. The method of claim 12 wherein said first source of dietary fiber is not more than about 3.5 grams per 8 ounces of base mixture; wherein said second source of dietary fiber provides up to about 2.5 grams of fiber per 25 grams of fruit product; and wherein said total amount of fiber is from about 2 grams to about 7 grams per 8 ounces of final product.

14. A method of making fiber enriched cultured yogurt product comprising the steps of
   (a) mixing at least one milk product containing milkfat with ingredients comprising stabilizer, and a source of dietary fiber selected from a group consisting of oat fiber, soy fiber, gum arabic and mixtures thereof to thereby form a yogurt base wherein the amount of said milkfat is at least sufficient to make a low fat yogurt product and wherein the amount of said source of dietary fiber provides an amount of dietary fiber form about 2 grams to about 3.5 grams per 8 ounces of product;
   (b) homogenizing said yogurt base;
   (d) pasteurizing said yogurt base to form a uniform, substantially homogeneous, pasteurized mixture;
   (d) inoculating with lactic acid producing culture;
   (e) incubating the product of step (d) to produce yogurt product; and
   (f) cooling said yogurt product to stop fermentation.

15. A method of making fiber fortified Swiss style yogurt comprising the steps of:
   (a) mixing at least one milkfat-containing milk product with ingredients comprising stabilizer, and a source of dietary fiber selected from a group consisting of oat fiber, soy fiber, gum arabic and mixtures thereof to thereby form a yogurt base wherein the amount of said milkfat is at least sufficient to make a low fat yogurt product and wherein the amount of said source of dietary fiber provides an amount of dietary fiber from about 1.2 grams to about 3.5 grams per 8 ounces of product;
   (b) homogenizing and pasteurizing said yogurt base;
   (c) inculcating with lactic acid producing culture;
   (d) incubating said inoculated base to produce yogurt product with a pH in the rang of 4 to 5;
   (e) cooling said yogurt product to stop fermentation; and
   (f) mixing a fiber fortified yogurt fruit into the product of step (e);

wherein up to about 3 parts by weight of fiber fortified yogurt fruit is mixed with 10 parts by weight of the product of step (h); wherein said fiber fortified yogurt fruit is made by cooking a mixture comprising fruit, sugar and a second sourced of dietary fiber wherein said second source of dietary fiber is selected from a group consisting of soy fiber, oat fiber, gum arabic, and mixtures thereof and wherein the amount of said second source of dietary fiber is not more than about 4 grams per 25 grams of said fiber fortified yogurt fruit
and wherein said first source of dietary fiber and said second source of dietary fiber taken together provide a total amount of dietary fiber of from about 2 grams to about 10 grams per 8 ounces of final product.

16. A method of making serving size fiber fortified Sundae style fruited yogurt wherein said yogurt is fortified with from about 3 grams to about 6 grams of dietary fiber per 8 ounces of product by the steps comprising
(a) filling yogurt fruit product into a serving size container to thereby partially fill the container wherein said fruit product is fortified with a first source of fiber selected from a group consisting of gum arabic, soy, prunes and mixtures thereof, wherein the amount of dietary fiber provided by said first sourced of fiber is up to about 8% by weight based on the weight of said yogurt fruit product;
(b) filling a yogurt base into said partially filled container wherein said base has been fortified with a second source of bier wherein the amount of dietary fiber provided by said second source is from about 1.2 grams to about 3.5 grams per 8 ounces of Sundae style product;
(c) incubating the product of step (b) until a pH is reached that is suitable for yogurt product; and
(d) cooling said yogurt product;
wherein said yogurt fruit preparation is made by cooking a mixture comprising fruit, sugar and said second source of dietary fiber wherein said second source of fiber is selected from a group selected from soy fiber, oat fiber, gum arabic, prunes and mixtures thereof.

* * * * *